(12) United States Patent
Liebmann et al.

(10) Patent No.: US 10,654,663 B2
(45) Date of Patent: May 19, 2020

(54) REVERSAL MECHANISM

(71) Applicant: Superba S.A.S., Mulhouse (FR)

(72) Inventors: Hubert Liebmann, Wittelsheim (FR); Philippe Massotte, Gueberschwihr (FR)

(73) Assignee: Superba S.A.S., Mulhouse (FR)

( * ) Notice: Subject to any disclaimer, the term of this patent is extended or adjusted under 35 U.S.C. 154(b) by 0 days.

(21) Appl. No.: 16/151,658

(22) Filed: Oct. 4, 2018

(65) Prior Publication Data
US 2019/0100386 A1    Apr. 4, 2019

(30) Foreign Application Priority Data

Oct. 4, 2017 (EP) .................................. 17306328

(51) Int. Cl.
| | |
|---|---|
| *B65G 15/12* | (2006.01) |
| *B65H 19/14* | (2006.01) |
| *B65G 47/252* | (2006.01) |
| *B65G 43/08* | (2006.01) |
| *D06B 17/00* | (2006.01) |
| *D06B 23/04* | (2006.01) |
| *D02J 13/00* | (2006.01) |
| *B65G 23/44* | (2006.01) |
| *B65G 15/14* | (2006.01) |

(52) U.S. Cl.
CPC .......... *B65G 47/252* (2013.01); *B65G 43/08* (2013.01); *D02J 13/001* (2013.01); *D06B 17/00* (2013.01); *D06B 17/005* (2013.01); *D06B 23/04* (2013.01); *B65G 15/14* (2013.01); *B65G 23/44* (2013.01)

(58) Field of Classification Search
None
See application file for complete search history.

(56) References Cited

U.S. PATENT DOCUMENTS

| | | | | |
|---|---|---|---|---|
| 2,494,731 | A | | 1/1950 | Vincent et al. |
| 3,877,966 | A | * | 4/1975 | Goyffon .................. B05D 7/20 428/379 |
| 4,365,395 | A | | 12/1982 | Brantley |
| 5,542,547 | A | * | 8/1996 | Ricciardi .................. B07C 3/08 209/539 |
| 8,443,965 | B2 | * | 5/2013 | Matsuda ................. B29C 48/90 198/626.3 |
| 2008/0236994 | A1 | | 10/2008 | Birague |

FOREIGN PATENT DOCUMENTS

| | | |
|---|---|---|
| EP | 1975092 | 10/2008 |
| EP | 3228565 | 10/2017 |
| GB | 1047151 | 11/1966 |

OTHER PUBLICATIONS

Europe Patent Application No. 17306328.0, Search Report and Written Opinion dated Mar. 16, 2018.

\* cited by examiner

*Primary Examiner* — Kavel Singh
(74) *Attorney, Agent, or Firm* — Kilpatrick Townsend & Stockton LLP

(57) ABSTRACT

The present invention is a mechanism that reverses a product placed between a first upper conveyor belt and a second lower conveyor belt. The first one is linked to at least one cylinder on one end, characterized in that the reversal mechanism contains at least one means for clamping the product placed against the first conveyor belt moving on a portion of the periphery of the cylinder.

19 Claims, 1 Drawing Sheet

REVERSAL MECHANISM

CROSS-REFERENCE TO RELATED APPLICATION

This application claims priority from European Patent Application No. 17306328.0 filed Oct. 4, 2017, the contents of which are hereby incorporated by reference into this application.

FIELD OF THE INVENTION

The present invention relates to the area of a wire management mechanism in a wire heat treatment device and, more particularly, in the area of the management of wire routing inside a heat treatment device.

BACKGROUND OF THE INVENTION

The common method to treat a wire bundle, particularly by heat or steam treatment, is to run the wire bundle through a drying oven. Traditionally, this operation is done by placing a wire bundle on a conveyor belt that crosses one or more drying ovens. How long the wire bundle must undergo this treatment depends, partly, on the length of the conveyor belt moving in the drying oven as well as how quickly the said conveyor belt is moving.

To treat the bundle longer, it becomes necessary to increase the length of the drying over or slow down the conveyor belt's movement. However, the disadvantage of slowing down the conveyor belt's movement speed is that it slows the wire bundles' production. Likewise, increasing the length of the drying oven also creates larger floor space restrictions.

BRIEF SUMMARY OF THE INVENTION

The aim of the present invention is to address these issues by proposing a mechanism which, on one hand, makes it possible to adapt the heat treatment to longer procedure times and which, on the other hand, makes it possible to deal with any floor space issues.

The invention also focuses on a mechanism that turns over a product placed between a first upper conveyor belt and a second lower conveyor belt. The first one is linked to at least one cylinder on one end, characterized in that the reversal mechanism contains at least one means for clamping the product placed against the first conveyor belt moving on a portion of the periphery of the cylinder.

The invention also covers a wire heat treatment device, characterized in that the device comprises a structure forming a drying oven, including a first opening for the wire input and a second opening for the wire output, integrating at least two superimposed conveyor belts and at least one reversal mechanism, according to the invention.

BRIEF DESCRIPTION OF THE DRAWINGS

The invention will be better understood after reading the description below, which explains a preferred mode of operation, given only as an example, and explains with reference to the schematic drawings in the annex, in which.

DETAILED DESCRIPTION

Figure 1:
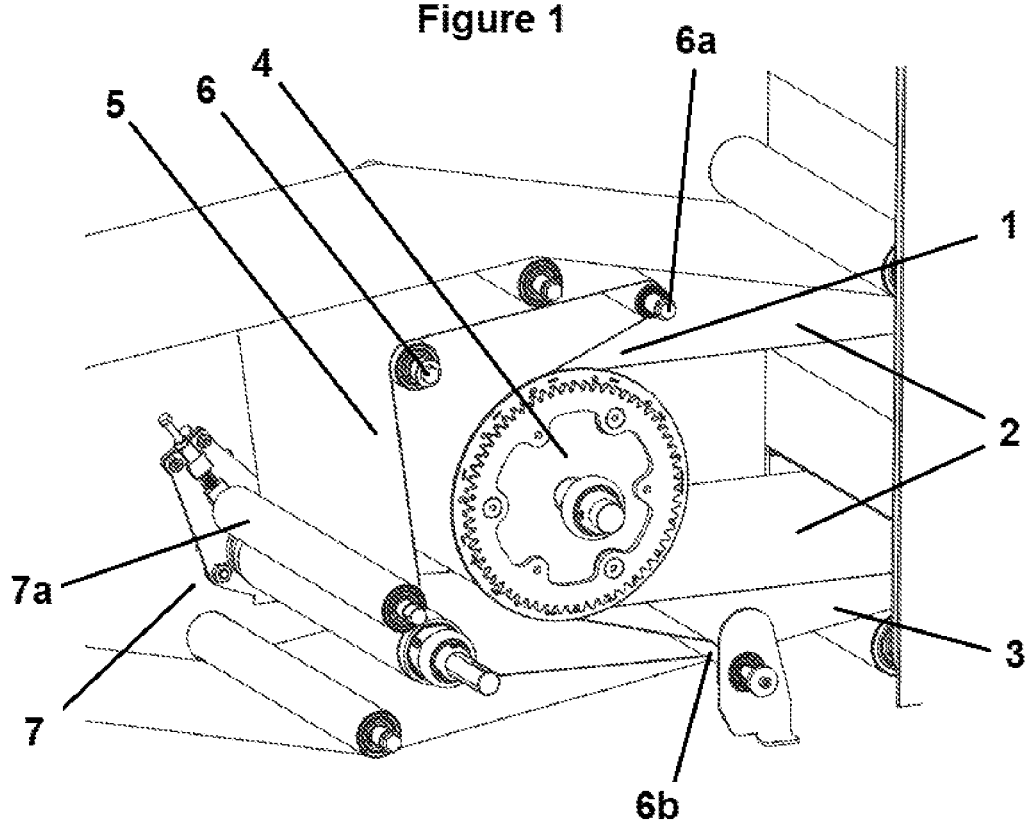
FIG. 1 is a schematic representation of a construction example of a mode of operation of the invention's reversal mechanism in which the clamping means involves a circular band.
Figure 2:
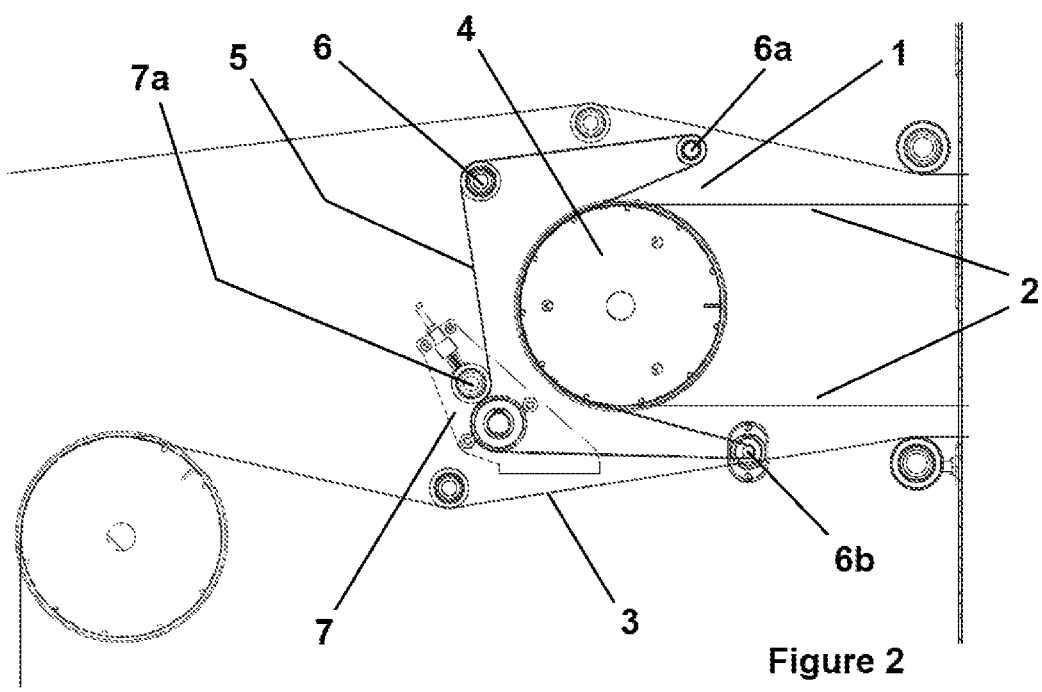
FIG. 2 is a schematic representation shown in the section of the construction example according to FIG. 1.

The present invention focuses on a reversal mechanism 1 of a product placed between a first upper conveyor belt 2 and a second lower conveyor belt 3. The first conveyor belt 2 is linked to at least one cylinder 4 on one end, characterized in that the reversal mechanism 1 contains at least one means for clamping the product placed against the first conveyor belt 2 moving on a portion of the periphery of the cylinder 4.

The reversal mechanism 1 of the invention makes it possible to stack several conveyor belts 2, 3 inside a treatment device, particularly wire heat treatment. The reversal mechanism 1 makes it possible to transfer a product between the first upper belt 2 and the second lower belt 3 while retaining the layout and arrangement similar to that of the conveyor belt 2 to the other 3. This transfer quality is obtained through the product's clamping means, which presses the product against the upper conveyor belt 2 while moving on the cylinder 4. This pressure of the product against the conveyor belt 2 turning against the cylinder 4 makes it possible to control the movement of the product while it turns, thereby avoiding the product from chaotically falling while being transferred from one upper conveyor belt 2 to the lower conveyor belt 2. The clamping mechanism is thus arranged to keep the product in place against the upper conveyor belt 2 throughout most of the product's turning operation. When the product is turned by the mechanism of the invention, the product is transferred and placed on the lower conveyor belt 3 using gravity alone.

According to a first feature of the construction, the clamping means comprises at least one circular band 5 guided around several guide rollers 6. The presence of these different guide rollers 6 makes it possible to manage the trajectory of the circular band 5 so that this circular band 5 can move fluidly without being eroded by friction or harmful interference. Likewise, the circular band 5 can be moved while clamped between two guide rollers moving in counter-rotation.

Using the clamping product against the first conveyor belt 2 by moving it on the cylinder 4 using the circular band 5 makes it possible to use the flexibility of the band 5 to clamp the product, by following the shape of the product placed on the surface of the upper conveyor belt 2. This flexibility of the circular band 5 placed against the transport band 2 makes it possible through the clamping means to keep the entire part of the product touching the conveyor belt 2 at the cylinder 4. Compared to a more rigid clamping means, the flexible circular band 5 makes it possible to avoid holding the product, by touching and placing pressure only on the thickest part of the product in contact with the conveyor belt 2 on the cylinder 4. Indeed, with a more rigid clamping means, contact at the product's thickest location creates a strictly localized clamping of the product against the conveyor belt 2, so that the thinner parts of the product are not held against the conveyor belt 2 when moving around the cylinder 4. The product is turned over less efficiently. When the product placed is a wire bundle, the distribution of the wires placed on the upper conveyor belt 2 varies in thickness. Thus, the elasticity of the circular band 5 stretched against the upper conveyor belt 2 makes it possible to maintain the wire bundle against the upper conveyor belt 2 by independently moving with variations of thicknesses that could exist at one point of contact between the clamping means and the upper conveyor belt 2.

According to a preferred operation example, the circular band 5 of the clamping means is done in a material that is sufficiently flexible in its length to follow the curves of the guiding rollers 6 and the cylinder 4. In addition, the circular band 5 is also flexible in its width to adapt to the variations in thickness of the wire bundle spread out and moving on the upper conveyor belt 2 rotating on the cylinder 4.

According to a preferred construction, the circular band 5 has sufficient elasticity in its width to adapt to the variations in thickness that there might be with a spread-out bundle of wires placed on the band 2 around the rotating cylinder 4. This elasticity is paired with sufficient heat resistance to allow it to function in an environment that will undergo heat treatment of the moving wire bundle.

According to the different variants of the construction, the circular band 5 can be done in the form of a flexible elastic plastic band, a film, a membrane or also in the form of a knitted fabric or a net or even several bands laid out parallel to one another.

It should be noted that according to a preferred construction, the circular band 5 moves in the opposite direction as the upper conveyor belt 2. However, to effectively clamp, the movement speed of the circular band 5 against the upper conveyor belt 2 is identical to that of the upper conveyor belt 2. The movement of these two bands 2, 5 can be operated by independent driver mechanisms or by one shared driver mechanism. According to a construction specificity, the driver of the circular band 5 is operated by the friction of the upper conveyor belt 2 against that which the circular band 5 is held in pressurized contact.

According to a feature of the construction, the reversal mechanism 1 is characterized in that, since the circular band 5 is pressed against a portion of the cylinder's 4 periphery located on half of cylinder 4 defined in relation to a vertical reference plane passing through the cylinder's 4 rotational axis, the circular band 5 is arranged to pass around at least two guiding rollers 6a, 6b arranged in the part of the space opposite the portion of the cylinder 4 in contact with the circular band 5 with regard to the vertical reference plane passing through the rotational axis of the cylinder 4. These two guiding rollers 6a, 6b arranged strategically with regard to cylinder 4, around which and with which the high conveyor belt 2 moves, help move a part of the circular band's 5 circuit along the upper conveyor belt 2 and the cylinder 4. Thus, over its circuit, the circular band 5 moves successively around a first guiding roller 6a following a first direction of rotation, then it will bypass cylinder 4 against the upper conveyor belt 2 by moving in an opposite rotational direction as the first, and then turns around a second guiding roller 6b in the same direction as the first preceding guiding roller.

According to a construction particularity, the first guiding roller 6a is sufficiently far away from the upper conveyor belt 2 to create a space between the circular band 5 and the upper conveyor belt 2 and to facilitate the insertion of the product being moved on the upper conveyor belt 2. Thus, the product is gradually clamped by the circular band 5 while being rotated around the cylinder 4 by the upper conveyor belt 2, over the upper conveyor belt 2.

Likewise, according to another construction particularity, the second guiding roller 6b is sufficiently far away from the upper conveyor belt 2 to create a space between the circular band 5 and the upper conveyor belt 2, below the upper conveyor belt 2. This arrangement is done so that the product can be secluded and retrieved on the circular band 5 before being placed on the lower conveyor belt 3.

According to a construction particularity of the circular band 5, linked to a stressed holding mechanism 7 on at least one point against the first conveyor belt 2 circulating around a portion of the cylinder periphery 4. The stressed holding mechanism 7 acts on the circular band 5 to, on one hand, create stress so that a part of the circular band 5 places pressure against the first conveyor belt 2 and, on the other hand, create a loosening of the circular band 5 so that it moves with at least an optimized fluidity with regard to the limits of stress supported.

According to a specificity of the construction, the stressed holding mechanism 7 includes at least one roll 7a, mounted so that it can move on an axis included in a plane perpendicular to the rotational axis of cylinder 4. The movement of roller 7a along this particular axis allows the roller 7a to move closer or farther away to or from the guiding rollers, so that the movement circuit of the circular band 5 is stretched/lengthened or, on the contrary, tightened. According to an operation example roller 7a is linked to one movement axis formed by at least one rail. Preferably, roller 7a and the rail are linked at one of the ends of the roller 7a. Additionally, each end of roll 7a is mounted sliding along a respective rail, the rails positioned on each of the ends of the roller 7a being arranged along the parallel axis between them.

According to a construction particularity of the reversing mechanism 1 of the invention, at least one portion of the circular band 5 positioned around a guiding roller 6b is positioned below the first upper conveyor belt 2 and above the second lower conveyor belt 3. This positioning of the circular band 5 allows the circular band 5, being on one hand positioned under the first upper conveyor belt 2, to turn the product over and form a transporting structure that carries the reversed product and, on the other hand being positioned over the second lower conveyor belt 3, to place the turned over product on the second lower conveyor belt 3.

The turned-over product between the circular band 5 and the second lower conveyor belt 3 is transferred using simple gravity, when the product moved by the circular band 5 passes the point of reversal of the circular band 5 around the guiding roller 6b. When it reaches this reversal point, the circular band 5 pivots around the guiding roller 6b. Since the product held by the circular band 5 is not held on the band, it falls onto the second lower conveyor belt 3.

According to a construction particularity, the guiding roller 6b positioned between the first upper conveyor belt 2 and the second lower conveyor belt 3 is placed as close as possible to the second lower conveyor belt 5 positioned under the guiding roller 6b, or brought closer to the second lower conveyor belt 3 without touching this band 3. This arrangement can limit the product's falling height when placed on the second lower conveyor belt 3 from the circular band 5.

According to a construction alternative of the clamping means, it may include at least one rigid structure that pivots around an axis parallel to the rotational axis of cylinder 4 and including at least one portion pressed against a part of the first upper conveyor belt 2 on the peripheral surface of the cylinder 4. According to this construction, which is an alternative to the circular band 5, the rigid structure of the clamping means creates a pressure by one of its sides against the surface of the first upper conveyor belt 2.

According to a particularity of this construction, the portion pressed against the peripheral surface of the cylinder 4 presents a substantially curved shape. The curving of this portion is adapted to best follow the curve of the first upper conveyor belt 2 by moving on the cylinder 4. This cooperation of shape thus allows the clamping means to press the product against the first upper conveyor belt 2 along a larger portion of the cylinder's 4 periphery and thus ensure the product is held while being turned over for a longer part of the route.

According to another particularity, the rigid pivoting structure of the clamping means works with a return mechanism, for example a spring, to keep the clamping means pressed against the product being turned over with the first upper conveyor belt 2. Alternatively, this return mechanism can use gravity alone to keep the clamping means against the product and the first upper conveyor belt 2.

According to an additional characteristic, the lower edge of the rigid structure of the clamping means is arranged to be positioned nearby the second lower conveyor belt 3. This arrangement thus helps place the product on the second lower conveyor belt 3 from the lower edge of the rigid structure of the clamping means by restricting the falling height when placing the product.

According to another construction alternative of the clamping means, this includes a surface firmly held by at least one part against the first upper conveyor belt 2 circulating on a portion of the cylinder's 4 periphery. This surface is spread between a high position located above the first upper conveyor belt 2 and a low position located below the first lower conveyor belt 3. This surface is flexible, which allows it, on one hand, to follow the curve of the first upper conveyor belt 2 where it is moved around cylinder 4 and, on the other hand, to adapt to the varying thickness of the wire bundle spread out and moving the upper conveyor belt 2 and rotating around the cylinder 4.

According to the different variants of the construction, the flexible surface can be in the form of a knitted fabric or a net or even several bands laid out in parallel to one another.

According to a construction particularity, the surface is held under stress by at least one elastic means, which creates a connection between the fabric and a frame. According to one construction example, among others, the surface is rectangular and is held under stress by an elastic means positioned at each of its corners. At least one central part of the surface is thus positioned in a way that overlaps the upper conveyor belt 2 where it is being moved around the cylinder 4. This overlapping is done so that there is a space between the upper edge of the surface and the upper conveyor belt 2, above the upper conveyor belt 2, so that it facilitates the insert of the product moved on the upper conveyor belt 2.

Likewise, and preferably, the overlapping by the surface is done in a way that creates a space with the upper conveyor belt 2, below the upper conveyor belt 2. This arrangement is done so that the product can be secluded and retrieved on the surface before being taken and placed by gravity on the second lower conveyor belt 3.

The invention also covers a wire heat treatment device, characterized in that the device comprises a structure forming a drying oven, including a first opening for the wire entry and a second opening for the wire exit, integrating at least two superimposed conveyor belts and at least one reversal mechanism, according to the invention. Contrary to the known wire treatment device that does not integrate any reversal mechanism of the invention and in which the wire is moved only via a single conveyor belt, the heat treatment device of the invention allows several conveyor belts 2, 3 moving in opposite directions to be superimposed. This overlapping of the conveyor belts 2, 3 makes it possible to reduce the floor space occupied by the heat treatment device, even reduce the total volume of the drying oven and thus the amount of energy required for a heat treatment.

According to a particularity of the invention's heat treatment device, this includes:
Three superimposed conveyor belts arranged to define a first upper conveyor belt, a second middle conveyor belt and third lower conveyor belt,
Two reversal mechanisms arranged so that the first mechanism is positioned to reverse the product from the upper belt to the middle belt and that the second mechanism is positioned to reverse the product from the middle conveyor belt to the lower conveyor belt,
Since the upper conveyor belt is positioned from the entry opening toward the first reversal mechanism and the lower conveyor belt is positioned from the second reversal mechanism toward the device's output.

The heat treatment could also relate to a more specific treatment device, for example a steam-type treatment.

Such a construction with an odd number of conveyor belts makes it possible to position an input and an output for the device on the different sides of the device.

Of course, the invention is not limited to the operation mode described and represented in the drawings attached. Changes are possible, particularly in terms of creating various elements or substituting technical equivalents, without necessarily leaving the invention's sphere of protection.

What is claimed is:

1. A wire heat treatment device comprising:
   a structure forming a drying oven with a first opening for a wire entry and a second opening for a wire exit and integrating at least two superimposed conveyor belts within the drying oven; and
   at least one reversal mechanism, the at least one reversal mechanism comprising:
      a first upper conveyor belt;
      a second lower conveyor belt, wherein the first upper conveyor belt and the second lower conveyor belt are configured to be positioned respectively above and below a product;
      at least one cylinder; and
      at least one clamping means configured to clamp the product against a portion of the first upper conveyor belt, the portion of the first upper conveyor belt moving on a portion of a periphery of the at least one cylinder, wherein the first upper conveyor belt is linked to the at least one cylinder, and wherein the reversal mechanism is configured to reverse a direction of travel of the product from a first direction to a second direction parallel to and opposite from the first direction by moving the product from the first upper conveyor belt to the second lower conveyor belt or from the second lower conveyor belt to the first upper conveyor belt.

2. The wire heat treatment device of claim 1, wherein the at least one clamping means comprises at least one circular band driven around several guiding rollers.

3. The wire heat treatment device of claim 2, wherein the at least one circular band is pressed against the portion of the periphery of the at least one cylinder, located on half of the at least one cylinder defined in relation to a vertical reference plane passing through a rotational axis of the at least one cylinder, and the at least one circular band is arranged to pass around at least two guiding rollers arranged in a space opposite the portion of the periphery of the at least one cylinder in contact with the at least one circular band with regard to the vertical reference plane passing through the rotational axis of the at least one cylinder.

4. The wire heat treatment device of claim 2, wherein the at least one circular band is linked to a stressed holding mechanism at least one point against the first upper conveyor belt circulating around the portion of the periphery of the at least one cylinder.

5. The wire heat treatment device of claim 4, wherein the stressed holding mechanism, including at least one guiding roller, is mounted so that it moves on an axis included in a plane perpendicular to a rotational axis of the at least one cylinder.

6. The wire heat treatment device of claim 2, wherein at least one portion of the at least one circular band is positioned around one of the several guiding rollers positioned below the first upper conveyor belt and above the second lower conveyor belt.

7. The wire heat treatment device of claim 3, wherein one of the several guiding rollers is positioned between the first upper conveyor belt and the second lower conveyor belt, and is placed as close as possible to the second lower conveyor belt positioned under the one of the several guiding rollers, or brought closer to the second lower conveyor belt without touching the at least one circular band.

8. The wire heat treatment device of claim 1, wherein the at least one clamping means includes at least one rigid structure that pivots around an axis parallel to a rotational axis of the at least one cylinder and includes at least one portion pressed against a part of the first upper conveyor belt on the periphery of the at least one cylinder.

9. The wire heat treatment device of claim 8, wherein the at least one portion pressed against the periphery of the at least one cylinder presents a substantially curved shape.

10. The wire heat treatment device of claim 1, wherein the at least one clamping means includes a surface held in pressure by at least one part of the first upper conveyor belt circulating on the portion of the periphery of the at least one cylinder, and the surface is spread between a high position located above the first upper conveyor belt and a low position located below the second lower conveyor belt.

11. The wire heat treatment device of claim 10, wherein the surface is held under stress by at least one elastic means, the at least one elastic means creating a connection between the surface and a frame.

12. The reversal mechanism of claim 1, wherein the wire heat treatment device comprises:
three superimposed conveyor belts arranged to define the first upper conveyor belt, the second lower conveyor belt and a third lowest conveyor belt;
two reversal mechanisms arranged so that a first reversal mechanism is positioned to reverse from the first upper conveyor belt to the second lower conveyor belt and that a second reversal mechanism is positioned to reverse from the second lower conveyor belt to the third lowest conveyor belt; and
the first upper conveyor belt is positioned from the first opening toward the first reversal mechanism and the third lowest conveyor belt is positioned from the second reversal mechanism toward the second opening.

13. A wire heat treatment device comprising:
a structure forming a drying oven with a first opening for a wire entry and a second opening for a wire exit and integrating at least two superimposed conveyor belts; and
at least one reversal mechanism, the at least one reversal mechanism comprising:
a first conveyor belt configured to convey in a first direction;
a second conveyor belt positioned vertically with respect to the first conveyor belt and configured to convey in a second direction different from the first direction;
a reversal cylinder positioned between the first conveyor belt and the second conveyor belt, wherein the first conveyor belt is wrapped around a portion of the reversal cylinder; and
a clamping surface that contacts the first conveyor belt around the portion of the reversal cylinder, wherein the clamping surface is configured to (1) clamp a product between the clamping surface and the first conveyor belt as the product traverses the portion of the reversal cylinder, (2) release the product after the product has traversed the portion of the reversal cylinder by diverging from the first conveyor belt and (3) reverse a direction of travel of the product from the first direction to the second direction as the product traverses the portion of the reversal cylinder to move the product from the first conveyor belt to the second conveyor belt or from the second conveyor belt to the first conveyor belt.

14. The wire heat treatment device of claim 13, wherein the clamping surface comprises a belt driven around a plurality of guide rollers.

15. The wire heat treatment device of claim 14, wherein the plurality of guide rollers comprises a tension member configured to apply a tension to the belt.

16. The wire heat treatment device of claim 14, wherein at least one of the plurality of guide rollers is positioned below the first conveyor belt and above the second conveyor belt.

17. The wire heat treatment device of claim 13, wherein the clamping surface comprises a rigid structure configured to pivot around a rotational axis of the reversal cylinder and apply a force on the portion of the reversal cylinder.

18. The wire heat treatment device of claim 13, further comprising a wire heat treatment device comprising an oven having a first opening for a wire entry through which the first conveyor belt passes and a second opening for a wire exit from the oven, wherein the first conveyor belt, the second conveyor belt, and the reversal cylinder are contained within the oven.

19. The wire heat treatment device of claim 18, the wire heat treatment device further comprising:
a third conveyor belt;
a second reversal cylinder positioned between the second conveyor belt and the third conveyor belt, wherein the second conveyor belt is wrapped around a portion of the second reversal cylinder;
a second clamping surface that contacts the second conveyor belt around the portion of the second reversal cylinder; and
the third conveyor belt and the second reversal cylinder are contained within the oven.

* * * * *